May 7, 1929.   A. E. PAYSON ET AL   1,712,228
BOTTLE CASING
Filed March 12, 1928
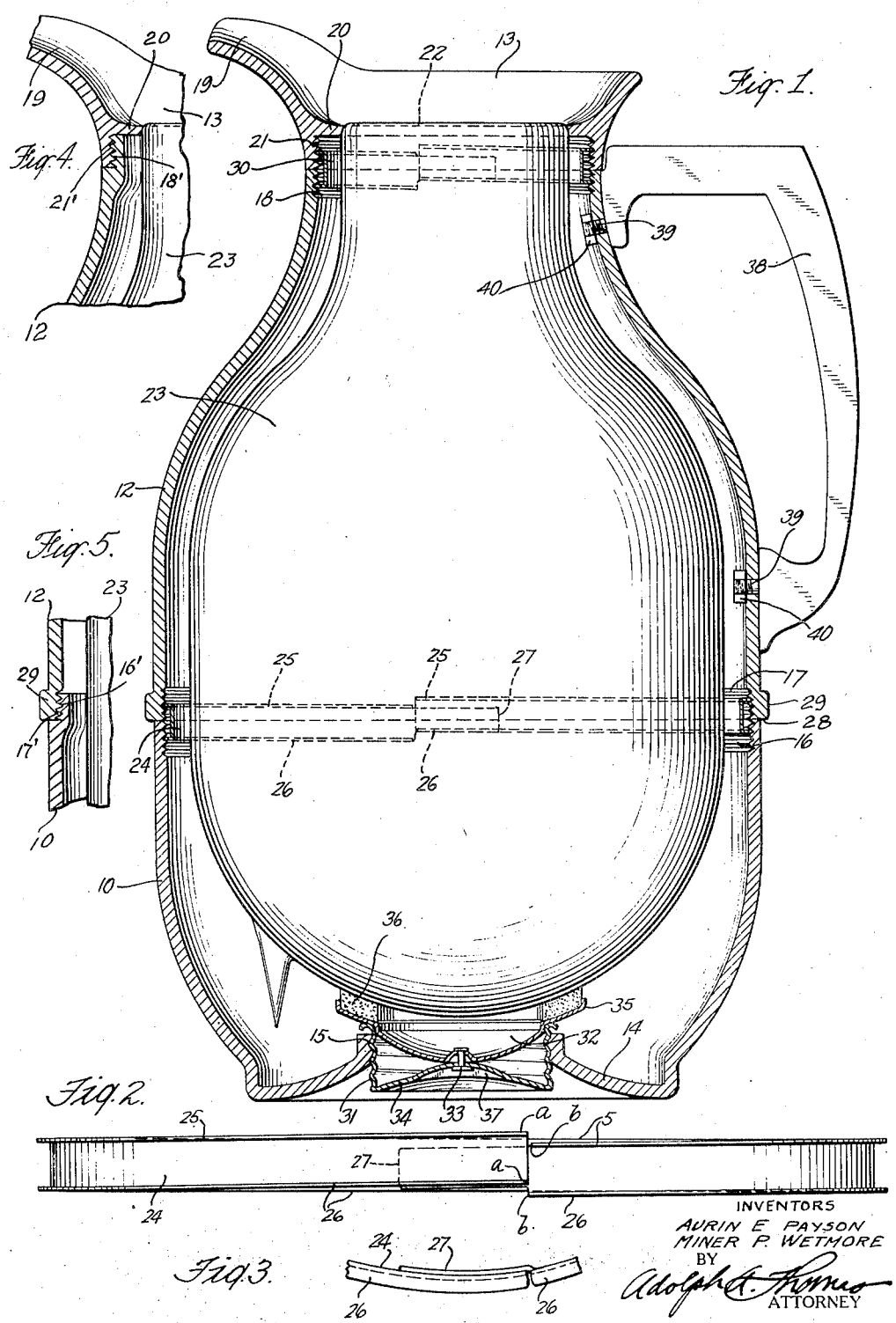
INVENTORS
AURIN E. PAYSON
MINER P. WETMORE
BY
Adolph A. Thomas
ATTORNEY Patented May 7, 1929.

1,712,228

UNITED STATES PATENT OFFICE.

AURIN E. PAYSON AND MINER P. WETMORE, OF NORWICH, CONNECTICUT.

BOTTLE CASING.

Application filed March 12, 1928. Serial No. 260,868.

This invention relates to double-walled vacuum bottles and its object is to provide a bottle casing of molded bakelite or other phenol condensation product. As will appear later, our new bottle casing has certain practical advantages over metal casings heretofore used.

It is well known that double-walled vacuum bottles of glass are enclosed in outer casings to protect the frail glass container and to give the article an attractive finished appearance. These casings have usually been made of metal suitably plated or decorated on the outside. There are several objections to metal casings of that kind: they are comparatively expensive and heavy, they are liable to be dented, the plating or ornamental surface coating tarnishes and frequently chips or peels off, and the sections comprising the casing require careful and often troublesome fitting at the screwthreaded joints on account of slight variations in the cut screwthreads.

We overcome the foregoing and other disadvantages of metal casings previously used for vacuum bottles by our new and improved casing of a molded phenol condensation product, of which bakelite is probably the best known example. In one form of our invention as applied to casings shaped to contain bottles with bulging bodies, the casing consists of several parts having screwthreads molded therein for direct connection with each other or for connection with metal rings of novel construction. The molded screwthreads make the parts interchangeable, thereby facilitating the work of assembling. The material is colored before being poured into the mold, so that the color becomes an integral part of the molded mass and not merely a surface coating. Hence, the color of the finished casing is permanent and can neither tarnish nor chip off. Furthermore, this molded casing will not dent, and is not only cheaper than metal but lighter as well.

To explain our invention and its practical usefulness, we have elected to show in the accompanying drawings a double-walled vacuum jug provided with our new form of casing, which of course is adaptable to bottles of various sizes and shapes. In these drawings—

Fig. 1 is a sectional view of the jug in full size;

Fig. 2 shows our new form of screwthreaded ring for connecting the parts of the molded casing;

Fig. 3 shows an edge view of the overlapping ends of the screwthreaded ring; and Figs. 4 and 5 are fragmentary detail views of a modified construction in which the molded screwthreads of the casing parts directly engage each other.

Referring to Fig. 1, the outer casing of the vacuum lip jug illustrated in the drawings comprises a base section 10, a breast section 12 and a top piece 13. Each of these three parts is molded as a unit. At the present time we prefer to make the casing parts of bakelite, but any other similar product may be used. The base section 10 has a bottom 14 provided with a screwthreaded opening 15 for a purpose that will presently be explained. Screwthreads 16 are molded into the upper end of base section 10. The breast section 12 is provided with screwthreads 17 at its lower end and with screwthreads 18 at the top. The top piece 13 is formed with a lip 19, an annular rim 20 and screwthreads 21. The rim 20 provides an opening 22 for the top edge of the glass filler 23, which is of the usual double-walled construction with a vacuum space between the walls.

When the breast section 12 is placed on the base 10, the screwthreads 17 and 16 coincide and form practically a continuous screwthreaded portion. The same is true of the screwthreads 18 and 21 when the top piece 13 is placed on the breast section 12. In connecting the screwthreaded portions 16—17 and 18—21, an ordinary screwthreaded ring could be used, but we prefer to use a connecting ring of novel construction. As best shown in Fig. 2, this ring consists of a sheet metal band 24 having lateral flanges 25 and 26 along its edges. One end of the ring terminates in a tongue or extension 27, which is secured to the back side of the other end of the ring in any practical way, as by soldering, brazing, riveting or otherwise.

When the ends of the band are connected to form a ring, the flanges 25 and 26 are laterally offset and thereby constitute screwthreads of one turn each beginning at $a$ and ending at $b$. The relative displacement of the flanges is sufficient to form screwthreads that will fit tightly into the screwthreads 16 and 17. In assembling the sections 10 and 12, the screw ring 24 is first attached to one of these sections and then the other section is screwed onto the ring until the two parts meet at the joint 28. The lower end of breast section 12 is preferably provided with an annular rib or head 29, which is not only ornamental, but also serves to hide the joint line 28, so that the parts 10 and 12 appear like a single member.

The top piece 13 is connected to the breast section 12 by a screw ring 30, which is like the ring 24, except of smaller diameter. Therefore, what has been said about joining the sections 10 and 12 by screw ring 24 applies to the screw connection between the ring 30 and the screw threaded portions 18 and 21. We have found by actual demonstration that the screw rings 24 and 30, which can be made of sheet brass, produce joints as tight and rigid as if the casing were made in a single piece. The flanges 25 and 26 are sufficiently yielding to grip the screwthreads of the casing parts in a self-locking joint which will not become loose. These screw rings are very much cheaper than ordinary screwthreaded rings in which the threads have to be cut in heavy metal.

Before the breast section 12 is connected to the base section 10, a screw plug 31 is inserted through the top of the section into the screw opening 15 of the base 14. The screw plug 31 carries a cup-shaped disk 32 riveted at 33 to the inverted bottom 34. An extension 35 supports a ring 36 of cork, rubber or other cushioning material. The ring 36 is shaped to engage the rounded bottom of the vacuum bottle 23. A slot 37 in the bottom of screw plug 31 permits the insertion of a coin or other instrument for screwing the plug in after the casing has been completely assembled with the bottle inside. The cushioning ring 36 is forced against the bottle 23 with sufficient pressure to hold the upper edge of the bottle firmly against the rim 20 of top piece 13, so that no liquid can leak into the casing. The bottle is thus supported out of contact with the casing except at the rim 20. This tends to improve the heat-insulating properties of the jug, particularly since the casing is practically a non-conductor of heat. The cushioning ring 36 takes up any sudden shocks to which the bottle may be subjected.

A handle 38 is attached to the breast section 12 in any practical way opposite the lip 19. In the present instance, we have shown the handle provided with screwthreaded pins 39 projecting through holes in the breast section and adapted to receive nuts 40. The handle 38 may be of plated metal, or it may be molded of the same material as the casing. It goes without saying that the handle is attached to the breast section before the latter is screwed on the base of the casing.

In Figs. 4 and 5, the base section 10 and breast section 12 have molded screwthreads 16' and 17', respectively, which directly engage to secure the parts together. Similarly, the top pieces 13 and the upper end of breast section 12 are formed with integral screwthreads 21' and 18', respectively, which interlock to hold those two sections together like a single piece. The construction of Figs. 4 and 5 is therefore of utter simplicity, all the casing parts being self-locking without separate connecting means.

The plastic material of which the casing parts 10, 12 and 13 are shaped is colored in mass before the molding operation, so that the color is uniformly and permanently embodied in the material as an integral part thereof. Consequently, the color in the finished casing cannot come off, nor can the outer surface tarnish as in the case of metal. When we speak of color in this connection, both here and in the claims, we use the word in its broadest practical sense to include not only colors of the spectrum, but black and white, which are popularly called colors, metallic colors like gold, silver, copper and the like, and any combination or mixture of colors. The molded screwthreads 16, 17, 18, 21 and 16', 17', 18' and 21' make the parts interchangeable, so that any breast section will fit on any base section, and any top piece will fit on any breast section. This interchangeability greatly facilitates the work of assembling and thereby reduces the labor cost of the finished product. Metal casings do not possess this advantage, because there it is impossible to avoid slight variations in screwthreads due to varying hardness of the metal and other factors.

The molded casings of our invention are not only cheaper than metal casings, but considerably lighter in weight, so that it is easier to handle the completed product. Then, too, metal casings are easily dented when suddenly struck against a hard object, as may often happen in handling the bottle. Our new casing is not subject to denting or other disfigurement, and it may be said to be practically indestructible in the ordinary course of use. A further disadvantage of a metal casing for vacuum bottles lies in the fact that where the glass contacts with the metal the latter conducts heat from the filler and thereby reduces the efficiency of the bottle. To prevent that, it has been necessary to interpose a rubber ring between the metal casing and the mouth of the glass bottle, thus adding to the cost of manufacture. The molded casing of our invention has heat-insulating qualities which permit direct contact with the glass filler, thereby simplifying the construction and at the same time improving its efficiency.

Our new casing of bakelite or other phenol condensation product is applicable to glass containers of various sizes and shapes, such as may be found in carafes, food jars and other types of double-walled vacuum containers. When we speak of a bottle in the claims, we use the term in its broadest possible sense to include any practical form of container. In some instances, the casing may be so shaped that it may be molded in two sections, particularly where no pouring spout is needed. We want it understood that our invention is not limited to the details set forth, and it is to be expected that changes and modifications will occur to those skilled in the art without departing from the scope of the invention as defined in the following claims. When we speak of phenol condensation products in reference to our new bottle casing, we include such other moldable condensation products as come within our claims as equivalents.

We claim as our invention:

1. A bottle casing composed of a phenol condensation product molded in sections having integral screwthreads for securing the sections together, said casing having suitable coloring matter permanently embodied therein as an integral part of the molded structure.

2. An outer casing for double-walled vacuum bottles composed of bakelite molded in sections which are connected at their adjacent ends by means of screwthreads forming practically invisible joints, said casing being shaped to enclose a bottle and having integral means at the top arranged to engage the mouth of the bottle and thereby hold the latter firmly in the casing.

3. An outer casing for double-walled vacuum bottles composed of bakelite molded in sections which are connected by screwthreads formed integral with the sections and directly interlocking, said casing having an integral annular rim at the top arranged to engage the rim of the bottle in firm contact, and means mounted in the bottom of said casing for holding the bottle rim pressed against said top rim of the casing.

4. A bottle casing made of molded material of the type represented by phenol condensation products, said casing comprising a base section, a breast section and a top section, the adjacent ends of these three sections having screwthreads molded therein for securing the sections together, an integral rim on said top section defining an opening to receive the mouth of a bottle in the casing, and means on said base section for supporting a bottle in the casing and holding the mouth of the bottle pressed firmly against the rim of said opening.

5. A bottle casing made of molded material of the type represented by phenol condensation products, said casing comprising a base section, a breast section and a top section, the adjacent ends of these three sections having screwthreads molded therein for securing the sections together, an integral rim on said top section defining an opening to receive the mouth of a bottle in the casing, and an integral tubular extension formed in the center of said base section, said tubular extension being screwthreaded on the inside for the purpose specified.

6. A bottle casing made of molded material of the type represented by phenol condensation products, said casing comprising a base section and an upper section having integral screwthreads formed in their ends, said screwthreaded portions being adapted to interlock directly for securing the two sections together, an annular rim formed near the top of the upper section, said rim defining an opening of predetermined size, and means on said base section for supporting a bottle in the casing and holding the mouth of the bottle pressed firmly against the rim of said top opening.

7. A bottle casing made of molded material of the type represented by phenol condensation products, said casing comprising a base section, a breast section and a top section, the adjacent ends of these three sections having screwthreads molded therein for securing the sections together, an integral rim on said top section defining an opening to receive the mouth of a bottle in the casing, said base section having a screwthreaded opening at the bottom, a plug screwed into said bottom opening, and a resilient member carried by said plug to engage the rounded bottom of a bottle, said supporting plug being adjustable from outside the casing to hold the mouth of the bottle pressed firmly against the rim of said top opening.

8. A bottle casing made of molded material of the type represented by phenol condensation products, said casing comprising a base section, a breast section and a top section, the adjacent ends of these three sections having screwthreads molded therein for securing the sections together, said top section having an inwardly extending rim defining an opening to receive the mouth of a bottle in the casing, said breast section having a pair of holes, a handle provided with two pins extending through said holes, means engaging said pins to secure said handle to the breast section, and means on said base section for holding a bottle in the casing and holding the mouth of the bottle pressed firmly against the rim of said opening, said bottle being held clear of said pins.

9. A lip jug comprising an outer casing made of molded material of the type represented by phenol condensation products, said casing comprising a base section, a breast section and a top section, the adjacent ends of these three sections being screwthreaded on the inside for securing the sections together, a rim on said top section defining an opening to receive the mouth of a bottle in the casing, a lip or spout formed on said top section above said rim, said base section having a bottom with a screwthreaded cylindrical extension, a plug screwed into said extension, a resilient member carried by said plug to engage the rounded bottom of a bottle, said supporting plug being adjustable from outside the casing to hold the mouth of the bottle pressed firmly against the rim of said opening, and a handle secured to said breast section diametrically opposite said lip.

10. A lip jug comprising an outer casing made of molded material of the type represented by phenol condensation products, said casing comprising a base section, a breast section and a top section, the adjacent ends of these three sections being screwthreaded on the inside for securing the sections together, a rim on said top section defining an opening to receive the mouth of a bottle in the casing, a lip or spout formed on said top section above said rim, said base section having a bottom with a screwthreaded cylindrical extension, a plug screwed into said extension, a resilient member carried by said plug to engage the rounded bottom of a bottle, said supporting plug being adjustable from outside the casing to hold the mouth of the bottle pressed firmly against the rim of said opening, a handle provided with two screwthreaded pins or bolts extending through holes in said breast section diametrically opposite said lip, and nuts on said bolts to secure said handle to the breast section, said bottle being held clear of said bolts and said nuts.

11. An outer casing for double-walled vacuum bottle composed of a phenol condensation product molded in sections which are connected at their adjacent ends by practically invisible joints.

12. A bottle casing composed of a phenol condensation product molded in sections connected together along circumferential joints, said casing having suitable coloring matter permanently embodied therein as an integral part of the molded structure.

13. A bottle casing made of molded material of the type represented by phenol condensation products, said casing having suitable coloring material permanently embodied therein as an integral part of the molded structure.

14. A bottle casing made of molded material of the type represented by phenol condensation products, said casing being provided near the top with an integral circular rim or flange surrounding the mouth of the enclosed bottle.

15. A bottle casing made of molded material of the type represented by phenol condensation products, said casing being provided near the top with an integral circular rim or flange surrounding the mouth of the enclosed bottle, the bottom part of said casing having an opening surrounded by integral screwthreads adapted to receive a separate screwthreaded closure.

AURIN E. PAYSON.
MINER P. WETMORE.